3,692,540
PREPARATION OF PASTA FILATA CHEESE
Robert R. Mauk, Northbrook, Ill., assignor to Kraftco
Corporation, New York, N.Y.
No Drawing. Filed Sept. 8, 1969, Ser. No. 856,189
Int. Cl. A23c 19/02
U.S. Cl. 99—116                                 6 Claims

ABSTRACT OF THE DISCLOSURE

Pasta filata cheese is prepared by a method involving forming pasta filata curd in whey, holding the curd in the whey until the acidity of the whey is from 0.25 to 0.30 percent, draining the whey from the curd, washing the curd, salting the curd, pressing the curd, dividing the pressed curd into pieces, heating the curd pieces to a temperature of 130 to 160° F. while at a pH of 5.0 to 5.4 in the absence of working while immersed in water to form a soft plastic curd mass and packaging the plastic curd mass to provide pasta filata cheese.

---

The present invention relates generally to pasta filtata cheeses and more particularly relates to a method for making and packaging pasta filata cheeses.

Pasta filata cheeses, sometimes referred to as Italian cheese, have been prepared by a process that includes the step of immersing the curd in hot water or hot whey and working, stretching and molding the curd while it is in a plastic condition. The principal varieties of pasta filata cheese are provolone, scamorze and mozzarella.

In a conventional procedure for preparing a pasta filata cheese, such as mozzarella, milk is warmed to a temperature of about 87° F. A starter culture is added with sufficient rennet to coagulate the milk in about 35 minutes. The resulting coagulum is stirred with a paddle and is then cut to provide pieces of curd. The whey and curd are stirred with a mechanical stirrer for about ten minutes. The curd is then allowed to settle and the whey is drained. The curd is then collected in a cloth and transferred to a vat. Additional whey is squeezed from the curd in the vat. Then warm water or whey, usually at a temperature of about 120° F., is introduced into the vat to immerse the curd. The curd is kneaded and stretched by hand in the hot liquid and is then collected in a mass.

The temperature of the whey or water is then increased to about 135° F., and the curd is kneaded and stretched until the curd is smooth and cohesive and will form long threads when it is stretched.

At this point, the curd is cut into sections and each section is cut into slices which are placed in a second vat of water which has been heated to almost the boiling point, or sometimes hot fresh whey is used to immerse the slices, an they are kneaded and pressed with a paddle while they are immersed. The curd is then stretched by hand or with the paddle until it is very compact and elastic. The curd is then drawn out into a rope which is divided into portions of a size suitable for an individual cheese. Each portions is folded several times and is then immersed in hot water and as it cools it is shaped by hand to form a cheese. The cheese is then placed in a small mould and permitted to rest. Later, the cheeses are immersed in salt brine for a period of about 24 hours. The cheese is then dried in air and is wrapped and packaged for shipment.

It is apparent from the above description that considerable hand working of the cheese curd is required. It is also apparent that the process is complicated and subject to control problems. It would be desirable to provide a method for making pasta filata cheese that lessens the amount of hand work required and that is simple and economical.

One known method for overcoming the difficulties of the conventional procedure for making pasta filata type cheeses is disclosed in United States Letters Patent No. 3,117,008. Pasta filata type cheeses are made in accordance with this method without substantial handworking. In that method a low acid curd (less than 0.08 percent acidity in the whey) is provided containing biologically active acid-producing agents. The low acid curd is subjected to pressing under vacuum conditions to provide desired body and texture. Whie the method of this patent of about four weeks to permit the biologically active acid-producing agents to break down the curd to provide desired body and texture. While the method of this patent is an improvement over the prior art it would be desirable to provide a method of making pasta filata type cheeses without handworking and without a lengthy curing period.

Accordingly, it is an object of the present invention to provide an improved method for making pasta filata cheese. It is another object of the present invention to provide a method for making pasta filata cheese that lessens the amount of hand working of the curd. It is a further object of the invention to provide a method for making pasta filata cheese that is simple and economical and does not require a curing period.

These and other objects of the present invention will become more apparent from the following detailed description.

In general, in a process embodying various of the features of the invention, a fluid media is provided containing non-fat milk solids and fat. Acidity is developed in the media and the media is set with rennet to provide a coagulum, which is cut to provide curd and whey in accordance with conventional procedures for making pasta filata cheese. Thereafter, the curd is acid conditioned by holding the curd immersed in the whey until further acidity is developed to within a predetermined range. The whey is then drained from the curd and the drained curd is held until the curd develops a further particular level of acidity. The curd is then washed with water which has a temperature within a particular range and is salted and pressed to remove additional whey from the curd. Heating of the curd is then effected until a soft plastic mass is formed, and the curd is thereafter packaged in suitable containers.

In the method of the present invention for making pasta filata cheese, there is no working of the curd by hand while the curd is in a soft, plastic state. The elimination of hand working of the curd effects significant savings in time in the preparation of the curd. Packaging of the curd may also be effected more uniformly and conveniently.

As indicated, the fluid media which is used to prepare pasta filata cheeses contains non-fat milk solids and fat. The non-fat milk solids may be provided from whole milk, reconstituted dried non-fat milk solids, or skim milk. The fat may be milk fat, or other suitable fat. The fat may be provided from whole milk, partially skimmed milk, or a suitable fat may be added. Depending upon the type of pasta filata cheese to be made, fat is present at a level of from about 1 percent to about 4 percent by weight of the fluid media and non-fat milk solids are present at a level of from about 8 percent to about 11 percent.

Acidity is developed in the fluid media by the addition of a lactic acid producing culture, such as *Streptococcus lactis* and ripening the media. Ripening the media to develop acidity is continued until the acidity of the fluid media increases by at least about 0.01 percent above that of the initial acidity of the fluid media. The fluid media usually has an initial acidity of from about 0.14 percent to about 0.18 percent. The lactic acid culture will normally contribute an immediate increase in the acidity of the fluid media of about 0.01 percent. Therefore, after ripening, the total acidity of the fluid media is usually from about 0.16 to about 0.20. The fluid media is usually ripened in from about 30 minutes to about one hour when the ripening is performed at a temperature of 90° F. After ripening, the fluid media is set with rennet to provide a coagulum. The rennet is added at a level usually used in the production of pasta filata type cheese, i.e., about three fluid ounces of commercial single strength rennet per 1,000 lbs. of milk.

As used herein, acidity will sometimes be expressed by percent acidity (which refers to equivalent lactic acid unless otherwise indicated) and sometimes by pH. In this connection, the acidity of the fluid media may be easily determined by titration or direct pH measurement and expressed as either percent acidity or pH. However, after a coagulum has been formed and divided to provide curd and whey, the acidity of the curd and the whey may be different at any particular time and reference to acidity must be identified as being that of the curd or the whey. Acidity of the whey is determined by titration or by direct pH measurement with a conventional pH meter. Acidity of the curd is determined by the gold electrode and quinhydrone method. In this method a small (3–5 gram) quantity of curd is mixed by means of a mortar and pestle with sufficient quinhydrone (about 1–2 grams) to provide a light charcoal colored blend. The blend is placed in a tubular straw and a gold electrode is inserted into the blend. The electrode assembly is placed in saturated KCl solution and is bridged to a calomel electrode. The potential between the electrodes is measured and is converted to pH by reference to standard tables.

A firm coagulum is usually obtained about 30 minutes after the rennet is added. The coagulum is thereafter cut to provide curd and whey. The acidity of the whey after cutting is from about 0.10 to about 0.12 percent and the pH of the curd is from about 6.3 to about 6.5. After cutting, the coagulum may be stirred for a brief period of time to initiate whey expulsion from the curd. The curd is then heated in the whey gradually over a period of about 30 minutes to a temperature of from about 95° F. to about 120° F. Thereafter, the curd is stirred in the whey until the acidity of the whey is at least about 0.25 percent equivalent lactic acid to effect acid conditioning of the curd.

The curd and whey are then transferred to a drain table. Acid conditioning of the curd is then effected by holding the curd immersed in the whey until the acidity of the whey has increased to at least about 0.25 percent. Acid conditioning of the curd may be effected up to a whey acidity of about 0.30 percent. Acid conditioning of the curd while immersed in the whey to within the indicated range of whey acidities permits subsequent acidity development of the curd while on the drain table (to be described more fully hereinafter) to be more easily controlled. Also, it is believed that during acid conditioning of the curd while immersed in the whey the protein of the curd is rearranged and calcium ion is freed from the protein. It is believed that the freeing of calcium ion and its subsequent removal by curd washing is at least partially responsible for providing a pasta filata curd that may be directly heated and packaged in accordance with the invention.

The acid conditioning step may be effected after a portion of the whey has been removed. This permits recovery of a portion of the whey as low acid whey suitable for processing into an edible grade whey. Removal of a portion of the whey also permits the acid conditioning step to be effected in less time. Up to about 85 percent by weight of the whey may be removed prior to effecting acid conditioning of the curd in the whey. If a portion of the whey is removed prior to acid conditioning it should be removed before a whey acidity of about 0.18 is developed.

The curd and whey are then transferred to a drain table and the whey is drained from the curd to provide moist curd with some retained whey. The drained curd is held on the drain table until the acidity of the curd reaches a pH of from about 5.0 to 5.5, preferably from about 5.1 to about 5.3. The pH of the whey retained by the curd at this time is from about 5.05 to about 5.6 and the percent acidity of the retained whey is from about 0.35 to about 0.50.

The curd is then washed with water having a temperature of from about 40° F. to about 80° F., preferably from about 45° to about 60° F. The wash water is preferably added at a level of from about 15 to about 30 percent of the whey that was drained. Higher levels of addition of wash water may be used. However, no advantage is obtained and the increased level of wash water must subsequently be drained and disposed of. If the wash water temperature is much higher than the indicated range, the curd tends to become too firm and does not absorb moisture. It is not desirable to have the curd attain a firm condition at this point in the process of the present invention. The absorption of moisture is desirable so as to leach from the curd free lactose and free calcium ions. However, it is not desirable to have too much moisture absorbed by the curd. Washing of the curd with water having a temperature within this indicated range provides the desired level of moisture absorption in the curd.

The washing step may be repeated with an adidtional amount of wash water having a temperature within the indicated range. The curd is retained in the wash water about 15 minutes until the curd temperature is reduced to below about 75° F. Cooling of the curd shrinks the curd and expels whey and free lactose. As previously indicated, the washing step removes free calcium ion developed during the acid conditioning step and further leaches excess acid and free lactose from the curd. Removal of lactose is desirable to inhibit the fermentation process and limit further development of acidity. Washing the curd also aids in control of the final moisture of the curd to provide curd with a desired final moisture within the range of from about 40 to about 60 percent moisture. The curd acidity after the wash step is such that the pH of the curd during the subsequent heating step is from about 5.0 to 5.4, preferably about 5.1 to about 5.3.

The wash water is then drained and the curd is salted by direct addition of salt to the curd. The salt is added at a level sufficient to provide about 1.7 to about 2.6 percent salt in the final cheese product. Usually about 2.5 pounds of salt per 1,000 pounds of milk is sufficient to provide this level of salt.

The curd is then transferred to cheese hoops or drums and is covered and pressed for about one hour or longer. The curd may be stored overnight or may be cured for longer periods of up to several months if desired.

At this point the curd is ready for heating to convert the curd to the smooth, close-knit condition associated with pasta filata cheese. The curd is removed from the hoops and is broken into small pieces. The pieces are then heated in a suitable heating apparatus such as that used in heating process cheese. It is preferred to effect the heating by direct steam injection. The curd is heated to a temperature of from about 130° F. to about 160° F., preferably from about 140° F. to about 155° F. Lower temperatures within the above range are sufficient to establish the curd as a soft, plastic mass. Higher temperatures within the range and strenuous agitation may produce a rough textured product having a broken emulsion. If the acidity of the curd during heating is below about pH 5.0 the heated curd will have an undesirable texture and lack stringiness. If the acidity of the curd during heating is above about pH 5.4 the heated curd becomes rubbery and the emulsion may be broken.

Prolonged retention of the curd at the temperature of heating is detrimental and the curd should not be maintained at the elevated temperature of heating longer than about 30 minutes. The curd is preferably maintained at the temperature of heating for as short a time as possible, preferably less than about 5 minutes. After the temperature of the curd is reduced below heating temperatures, however, further cooling of the curd may be effected over a sufficiently long period of time to pasteurize the curd. Pasteurization provides pasta filata cheese with extended shelf life. However, the curd may be cooled immediately after packaging if desired.

The plastic curd, which is now in a flowable condition, is filled into containers by a suitable method. It is preferred to fill the curd by extrusion. In this connection, a conventional sausage stuffer or piston type filler may be used to fill the curd into containers. It is preferred to package the curd in shrinkable, plastic film tube packages which are sealed at points along the length of the tube. However, any suitable container may be used, such as preformed boxes.

The following example further illustrates various of the features of the invention, but is intended to in no way limit the scope of the invention which is defined in the appended claims.

EXAMPLE

Mozzarella cheese is produced by the method of the present invention. One thousand gallons of skimmed milk is standardized to provide a level of 2.6 percent milk fat by the addition of cream thereto. *Streptococcus thermophilus,* at a level of 0.5 percent, and *Streptococcus lactis,* at a level of 2.0 percent, cultures are then added. The milk is warmed to a temperature of 90° F. and is permitted to ripen for a period of one hour. At this time, the titratable acidity of the milk is 0.18 percent equivalent lactic acid. The titratable acidity of the milk before the starter cultures are added is 0.15 percent equivalent lactic acid. Three fluid ounces of commercial single strength rennet is then added for each thousand pounds of milk. After about 25 minutes the milk is set to provide a coagulum, and the coagulum is cut to provide curd and whey. The curd is stirred in the whey for 15 minutes and is then heated in the whey to a temperature of 98° F.

The curd is maintained in the whey while stirring is effected until the titratable acidity of the whey is .16 percent. The curd and whey are then pumped to a drain table and the whey is drained until the level of whey is one inch above the surface of the curd. The curd is held in the remaining portion of whey until the titratable acidity is 0.27 percent equivalent lactic acid. The free whey is then drained from the curd. The curd, containing residual whey in the curd particles, is then held on the drain table until the pH of the curd is 5.3.

Water at a temperature of 60° F. is then added to the curd. The water is added until the level of liquid in the cheese vat is about 20 percent of the level of liquid which was originally present in the vat before partial draining of the whey. The curd is held in the water until the curd temperature is 72° F. and the wash water is then drained. Salt is then added ot the curd at a level of 2.5 pounds of salt for each 1,000 pounds of milk which is used. The curd is stirred to disperse the salt and is then transferred to hoops which are lined with cloths. The curd is then pressed for a period of one hour at which time the pH of the curd is 5.2.

The curd is then removed from the hoops and is broken into pieces and is transferred to a process cheese cooker. The curd is then heated to a temperature of 153° F. by injecting steam directly into the curd. At this temperature a soft plastic curd mass is formed.

The plastic curd mass is then transferred to the hopper of a sausage stuffer. The curd is forced from the stuffer into a Saran plastic tube. The tube is sealed at intervals to provide individual packages of cheese curd. The packages are then dipped into water which is maintained at a temperature of 200° F. so as to shrink the film about the curd. The curd packages are then immediately removed from the hot water bath and are placed into a cold water bath, maintained at a temperature of 45° F., for 30 minutes. The curd is then ready for use and is substantially identical to mozarella curd produced by a conventional procedure.

Pasta filata cheese prepared by the method of the invention has a smooth, striated, slightly loose texture with a medium firm body. The flavor is bland, slightly acid and slightly salty. When the pasta filata cheese of the invention is shredded, spread on the surface of a pizza and baked, the cheese is stringy, has good spreadability and has a slightly oily sheen. The taste, appearance, color and baking properties are comparable to or better than pasta filata cheese made by conventional hand working methods.

The stability of the pasta filata cheese produced in accordance with the method of invention with respect to shelf life and body is superior to pasta filata cheese produced in accordance with conventional procedures.

Various of the features of the invention are set forth in the appended claims.

What is claimed is:

1. A method for making pasta filata cheese comprising providing pasta filata curd and whey, acid conditioning said curd by holding said curd immersed in said whey until the acidity of said whey is from about 0.25 percent to about 0.30 percent equivalent lactic acid, draining said whey from said curd, holding said drained curd until the pH of said curd is from about 5.0 to about 5.5, washing said curd, draining said wash water from said curd, adding salt to said curd, pressing said curd, dividing said pressed curd into pieces and heating said curd pieces in the absence of working while immerse in water to a temperature of from about 130° F. to about 160° F. to form a soft plastic mass from said curd and thereafter packaging said plastic curd mass to provide pasta filata cheese, said heating of said curd being effected while the pH of said curd is from about 5.0 to about 5.4.

2. A method for making pasta filata cheese in accordance with claim 1 wherein the pH of said curd during said heating is from about 5.1 to about 5.3.

3. A method for making pasta filata cheese in accordance with claim 1 wheerin said curd is held at said temperature of heating for less than about five minutes.

4. A method for making pasta filata cheese in accordance with claim 1 wherein said heating is sufficient to pasteurize said curd to provide extended shelf life.

5. A method for making pasta filata cheese in accordance with claim 1 wherein said curd is washed with water which is at a temperature of from about 40° F. to about 80° F.

6. A method for making pasta filata cheese in accordance with claim 1 wherein the final moisture of the cheese is from about 40 percent to about 60 percent by weight.

References Cited

UNITED STATES PATENTS

| | | | |
|---|---|---|---|
| 3,531,297 | 9/1970 | Kielsmeier et al. | 99—116 |
| 3,117,008 | 1/1964 | Mauk | 99—116 |

OTHER REFERENCES

Kosikowski, F., Cheese and Fermented Milk Foods, 1966 Edwars Bros., Inc., Ann Arbor, Mich. (pp. 158, 162–167, 191, 192, 290, 294), SF 271.KC.

Kosikowski, et al., The Heat Processing of Italian Curd Into Mozzarella Cheese, J. Dairy Science, vol. 27, 1954 (p. 639), SF 221J8.

Kosikowski et al., Processed Mozzarella Cheese, Milk Products Journal, vol. 48, Nov. 6, 1957 (pp. 10, 11 and 50) (copy Gt. 172).

A. LOUIS MONACELL, Primary Examiner

D. M. NAFF, Assistant Examiner

UNITED STATES PATENT OFFICE
CERTIFICATE OF CORRECTION

Patent No. 3,692,540      Dated September 19, 1972

Inventor(s) Robert R. Mauk

It is certified that error appears in the above-identified patent and that said Letters Patent are hereby corrected as shown below:

In the patent, Column 1, line 55, "an" should be --and--. In the specification page 3, line 3.

In the patent, Column 1, line 60, "portions" should be --portion--. In the specification page 3, line 8.

In the patent, Column 1, line 71, "cheese" should be --cheeses--. In the specification page 3, line 19.

In the patent, Column 2, line 12 delete "and texture. Whie the method of this patent" and insert --The pressed curd is then cured for a period--. In the specification page 4, lines 1 and 2.

In the patent, Column 2, line 48, "cheese" should be --cheeses--. In the specification page 5, line 10.

In the patent, Column 5, line 59, "ot" should be --to--. In the specification page 13, line 2.

In the claims, Claim 1, Column 6, line 33, "immerse" should be --immersed--.

In the claims, Claim 3, Column 6, line 43 "wheerin" should be --wherein--.

Under "Other References", column 6, the first reference, "Edwars Bros." should be --Edwards Bros.--; the second reference "vol. 27" should be --vol. 37--.

Signed and sealed this 6th day of March 1973.

(SEAL)
Attest:

EDWARD M. FLETCHER, JR.
Attesting Officer

ROBERT GOTTSCHALK
Commissioner of Patents